F. E. WALLER.
CONVERTIBLE AUTOMOBILE SEAT.
APPLICATION FILED APR. 24, 1918.
1,316,007.
Patented Sept. 16, 1919.
2 SHEETS—SHEET 2.
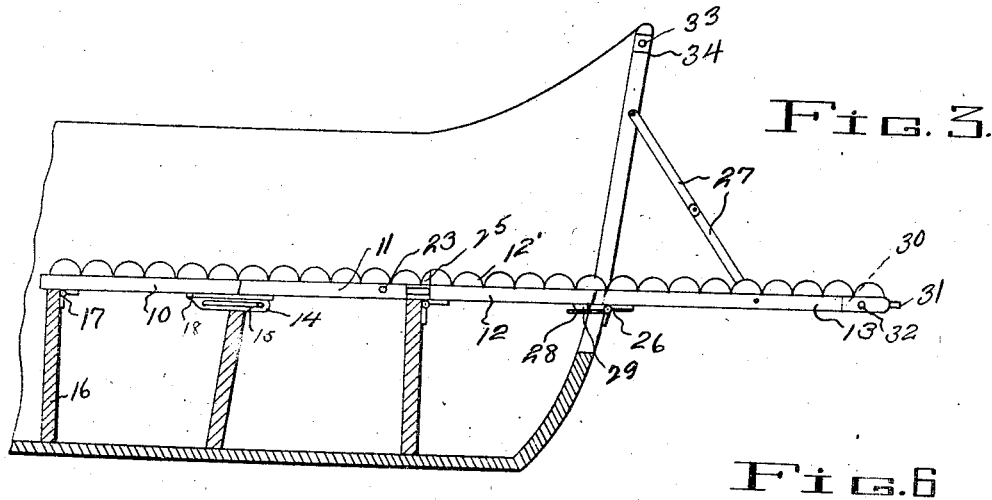
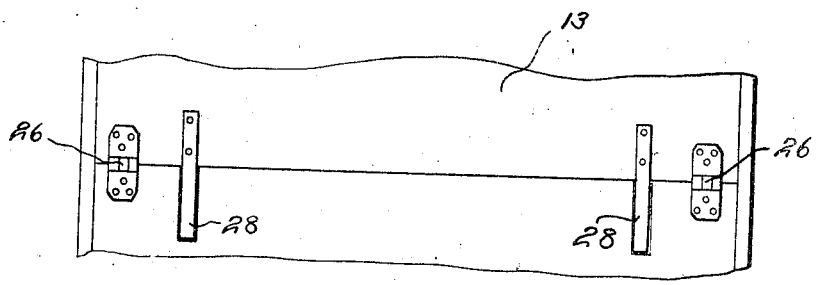
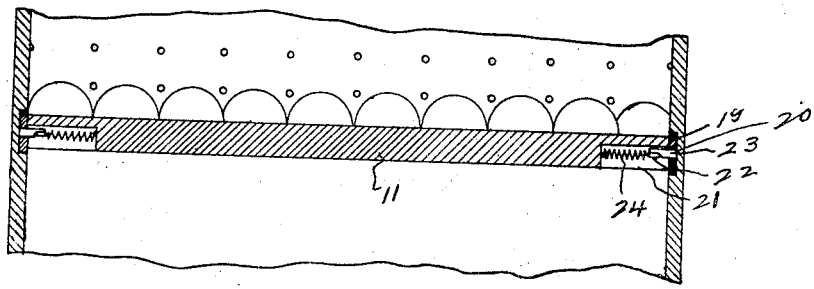
Inventor
F. E. Waller

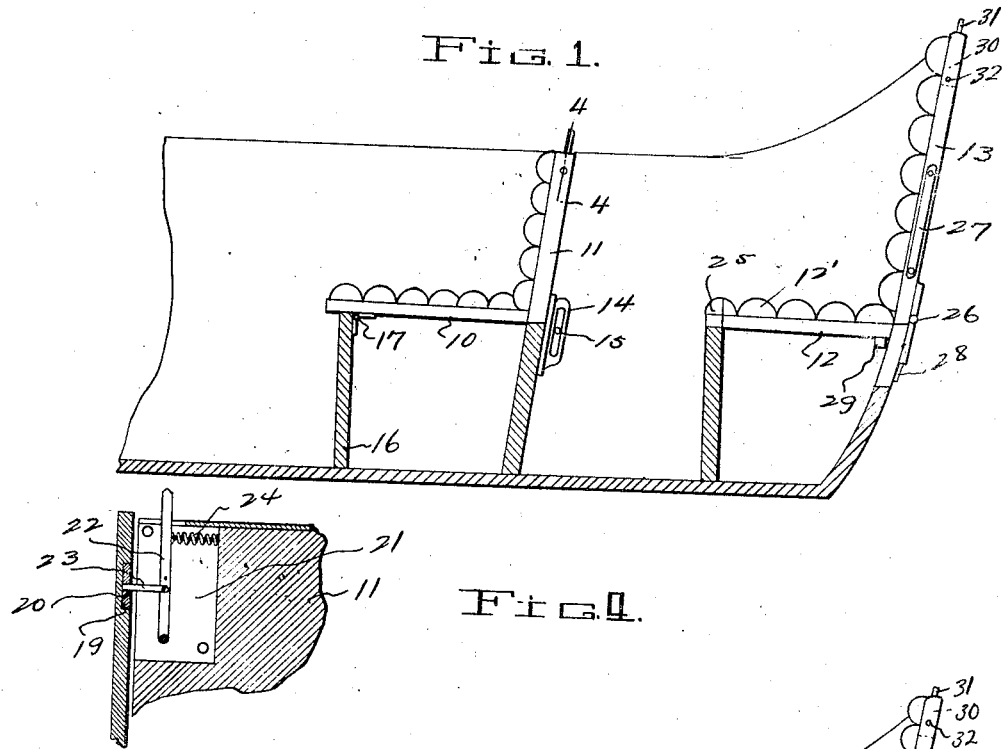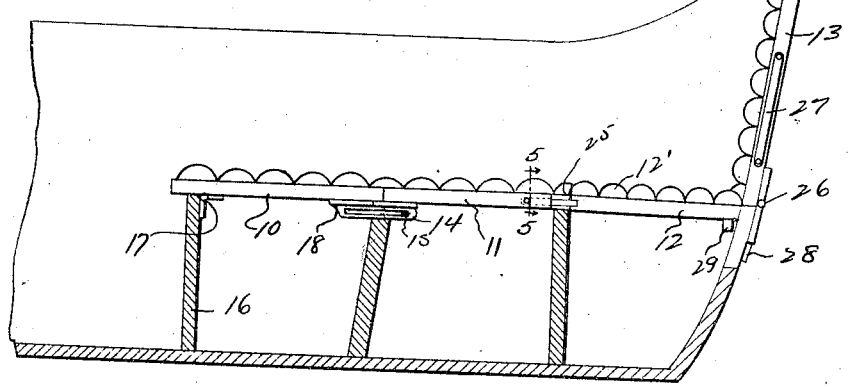

UNITED STATES PATENT OFFICE.

FOREST E. WALLER, OF NAPOLEON, OHIO.

CONVERTIBLE AUTOMOBILE-SEAT.

1,316,007.  Specification of Letters Patent.  Patented Sept. 16, 1919.

Application filed April 24, 1918. Serial No. 230,479.

*To all whom it may concern:*

Be it known that I, FOREST E. WALLER, a citizen of the United States, residing at Napoleon, in the county of Henry, State of Ohio, have invented certain new and useful Improvements in Convertible Automobile-Seats; and I do hereby declare the following to be a full, clear, and exact description of the invention, such as will enable others skilled in the art to which it appertains to make and use the same.

This invention relates to improvements in automobiles and particularly to convertible automobiles.

One object of the present invention is to provide a novel and improved construction whereby the seats of the automobile may be conveniently and easily adjusted to form a bed for the occupants.

Another object is to provide a device of this character wherein a novel and improved construction is provided for converting the automobile seats into a bed for use in the manner of an ambulance, the patient being readily placed in the automobile from the rear end thereof.

Other objects and advantages will be apparent from the following description when taken in connection with the accompanying drawings.

In the drawings:

Figure 1 is a side elevation of a portion of an automobile showing the seats in normal position, the side of the automobile being broken away to disclose the seats.

Fig. 2 is a similar view showing the seats in position for a bed.

Fig. 3 is a similar view showing the position of the seats when the automobile is used as an ambulance.

Fig. 4 is an enlarged vertical sectional view taken on the line 4—4 of Fig. 1, including the adjacent side of the automobile to show the means for holding the seat back in upright position.

Fig. 5 is a vertical sectional view taken on the line 5—5 of Fig. 2, showing the socket member used in holding the back in lowered position.

Fig. 6 is a fragmentary rear elevation of a portion of the back of the automobile and back of the rear seat showing the position of the members 28.

Referring particularly to the accompanying drawings, 10 represents the seat portion of the front seat of the automobile and 11 the back portion thereof. The seat portion of the rear seat is shown at 12, while the back portion is shown at 13. The lower portion of each side of the back 11, has longitudinally slotted secured thereto a member 14 in which is received a transversely extending rod 15 carried by the inner face of the side of the automobile. The front edge of the seat 10 is pivotally connected to the seat box 16, by means of the hinges 17, the rear end being arranged to be engaged and slightly elevated by the projections 18 carried by the lower ends of the slotted members 14, when the back 11 is swung downwardly and backwardly, as shown in Fig. 2. In the inner faces of the opposite sides of the automobile body, adjacent the upper end of the back 11, are countersunk the plates 19, in the center of each of which is formed an opening 20. In the sides of the upper end of the seat back 10 there are formed the recesses 21, and in each of these recesses there is pivotally mounted a vertical lever 22, the lower end of which carries a pivoted pin 23 for engagement in the opening of one of said plates 19. A spring 24, connected at one end to the lever, above the pivot thereof, and at its other end to the inner end wall of the recess, serves to rock the lever in a position to engage the pin in the opening 20, and yieldably hold the same therein. The other end of the lever projects upwardly beyond the upper edge of the back, in position to be grasped and rocked on its pivot for the purpose of releasing the pin from the opening, and thus permitting the lowering of the back. When the back is thus lowered, the upper ends of the levers 22 rest on the upper face of the seat portion 12 of the back seat, the cushion 12', of said seat being cut away at the forward corners, as at 25, to permit said levers to pass.

The back 13 of the back seat, is hinged to the body of the automobile at 26, and is adapted to be let down into the position shown in Fig. 3. Pivotally connected links 27 are pivotally connected to the sides of the back 13 and to the sides of the automobile to hold the back in an approximately horizontal position when lowered. The lower edge of the back 13 has secured thereto the depending projections 28 which, when the back is lowered, engage with member 29 carried by the rear portion of the seat 12, to elevate the same to a level with the lower edge of the back 13. The sides of the upper portion of the back 13 are also formed with recesses 30 in which are pivotally mounted the levers 31 carrying the pins 32 for engagement in the openings 33 of the plates 34.

It will be noted that when the back of the front seat is in lowered position so that a bed is formed, the cushions of the two seats and the one back are disposed in a horizontal plane, the sleeper lying with his head toward the front seat.

There is thus provided a novel and simple device whereby an automobile can be quickly and easily converted into sleeping quarters, or be readily converted into an ambulance when needed.

What is claimed is:

A convertible automobile including front and rear seats each having a movably connected back, the seats being constructed to have their rear portions slightly elevated, means carried by the said backs for supporting said seats in such elevated position, the back of the front seat being slidably and pivotally connected with relation to the front seat, and pivoted levers carried by said backs for engagement with means carried by the automobile for holding said backs in elevated position at times, and in lowered position at times.

In testimony whereof I affix my signature in the presence of two witnesses.

FOREST E. WALLER.

Witnesses:
G. S. MAY,
NORA C. DIEMER.